United States Patent [19]

Imura et al.

[11] 3,921,188

[45] Nov. 18, 1975

[54] SWITCHING DEVICES FOR USE IN PHOTOGRAPHIC CAMERAS

[75] Inventors: Toshinori Imura; Akira Yamanaka, both of Sakai, Japan

[73] Assignee: Minolta Camera Kabushiki Kaisha, Osaka, Japan

[22] Filed: Sept. 25, 1973

[21] Appl. No.: 400,644

[30] Foreign Application Priority Data

Sept. 26, 1972 Japan.......................... 47-111015[U]

[52] U.S. Cl..................... 354/51; 354/50; 354/60 R
[51] Int. Cl.².......................................... G03B 9/62
[58] Field of Search.......................... 354/50, 51, 60

[56] References Cited
UNITED STATES PATENTS

| | | | |
|---|---|---|---|
| 3,605,590 | 9/1971 | Kitai | 354/50 |
| 3,646,860 | 3/1972 | Kitai | 354/50 |
| 3,791,277 | 2/1974 | Kobori et al. | 354/51 |

*Primary Examiner*—Samuel S. Matthews
*Assistant Examiner*—Russell E. Adams
*Attorney, Agent, or Firm*—Watson, Cole, Grindle & Watson

[57] ABSTRACT

There is disclosed a switch device for use in an electric shutter control circuit having a storing circuit. A switch actuating member includes an electric contact of a storage switch and an electric contact common to at least an electromagnet switch and a discharge switch. The storage switch makes or breaks the connection between a light measuring circuit and the storing circuit. The electromagnet switch makes or breaks the connection between a potential source and an electromagnet governing the termination of the exposure in the electric shutter control circuit. The discharge switch allows discharge of a time constant capacitor in a timing circuit. The switch actuating member is movable from a cocked position to a rest position and is driven from the cocked position to the rest position in association with the releasing operation. Electrodes printed on an insulating plate, with which the plural electric contacts are brought into contact, open or close the plurality of switches. The switch actuating member governs the opening or closing of the plurality of switches through the shifting of that member from the cocked position to the rest position by the releasing operation.

9 Claims, 15 Drawing Figures

SWITCHING DEVICES FOR USE IN PHOTOGRAPHIC CAMERAS

BACKGROUND OF THE INVENTION

The present invention relates to switch mechanisms, and more particularly to switch mechanisms which actuate a plurality of switches in proper sequence for electric exposure control circuits in single lens reflex cameras having a through-the-lens (TTL) light measuring system.

It is known that in TTL light measurement systems in single lens reflex cameras, before the movable reflector (which is adapted to shift from the viewing position to the picture taking position by the release operation) initiates the exposure control operation, an output voltage of the light measuring circuit (which voltage is in proportion to the logarithmic value of the brightness of a photographic object) is stored by a storage means. A timing circuit is actuated by an antilogarithmically converted current generated from the stored voltage upon the commencement of the exposure. When a time constant capacitor in the timing circuit reaches a given voltage level, the switching circuit is reversed so as to energize an electromagnet, thereby terminating the exposure.

For the electric shutter mechanism to achieve the operation described, many switches are required, for example such as the following: A switch connected between the light measuring circuit and the storing circuit; a switch connected between the potential source and the electromagnet; a trigger switch connected in series with a time constant capacitor in the timing circuit; and a discharge switch for discharging the time constant capacitor.

It is imperative that the storage switch be normally maintained in a closed position and then opened before the reflecting mirror commences to shift from the viewing position to the picture taking position by the releasing operation and be maintained in the opened position until the switching circuit is reversed by the output from the timing circuit. This is necessary because a light receptive element of the light measuring circuit in a single lens reflex camera may be disposed at a position, such as on the back face of a movable reflecting mirror or on a pentagonal prism, where light rays from a photographic object which has passed through an objective lens are blocked when the movable reflecting mirror is shifted to the picture taking position.

The electromagnet in many cases is so arranged to be excited simultaneously with the commencement of the exposure, thereby locking othe shutter in the opened position and then the electromagnet is in turn demagnetized by reversing the switching circuit, so as to release the shutter from the open position. This is designed for improving the attraction of the electromagnet in consideration of the armature. Accordingly, the switch for the electromagnet must be closed prior to the commencement of the exposure and maintained in the closed condition until the shutter closing operation starts. However, because of the closed condition of that switch, a great amount of current flows through the electromagnet, which causes a voltage drop in the potential source. Accordingly, unless the switch for the electromagnet is maintained in an open condition during the time that the light measuring circuit output is being fed to the storing circuit, i.e. for the period that the storage switch is maintained closed, and unless the switch for the electromagnet is closed after the storage switch has been opened, an error will result in the light measuring circuit output, due to the voltage drop in the potential source.

The trigger switch must be closed simultaneously with the commencement of the shutter release by the shutter releasing operation and maintained in a closed condition until the reversing of the switching circuit terminates.

In contrast thereto, the discharge switch must be normally closed and opened immediately before the trigger switch is closed.

As is apparent from the foregoing, many switches are included in the electric shutter control circuit, and these switches must be actuated in the sequence described for only a short period.

The sequential operation of a plurality of switches as described is required not only in the electric exposure control circuit for use in a single lens reflex camera of the TTL type but also is required for a potential source switch and the switching of an exposure control circuit of the type in which the light measuring is preliminarily effected for setting the camera or the control circuit to a flash exposure condition or a daylight exposure condition. Subsequently, the connection of a light receptive element is switched from the light measuring circuit to the exposure time control circuit. Further, the sequential operation is required in the device, as disclosed in U.S. Pat. No. 3,574,443, which is used for measuring an amount of energy to be discharged for a desired short period after an energy discharge has been started. In such a device, the sequential operation is necessary for operating a timer triggering switch for starting the energy discharge and a switch for setting the device to a measurable condition. These switches, once they start to operate, must be operated at their own pace.

Switch mechanisms of that type have been proposed in the aforesaid U.S. patent and U.S. Pat. No. 3,623,410 as well. The switch mechanisms disclosed in such patents are so constructed as to actuate leaf spring contact type switches, by means of a switch operating member having a cam or pin. Because of contact instability during the time when the contacts are brought into contact with each other until a given contact pressure is established, and because of variations in the resiliency of contacts and errors in the attachment of the switch, it is almost impossible to ensure proper operation of the switches at a given time.

THE OBJECTS OF THE INVENTION

An object of the present invention is to provide a switch mechanism which operates a plurality of switches in a given sequence.

A further object of the present invention is to provide a switch mechanism in which the accuracy in the operational sequence of the plurality of switches therein is greatly improved and each switch is actuated at a given time of the switch mechanism, regardless of the fast or delayed manipulation of the switches.

A further object of the present invention is to provide a mechanism wherein in the device described, the switches are automatically restored to an initial condition when the device incorporating the switch mechanism having switches maintained in the actuated condition completes a given operation.

A still further object of the present invention is to provide a device in which such a switch mechanism of the type described is effectively coupled with the shutter mechanism of a photographic camera.

A still further object of the present invention is to provide a switch device wherein a switch of the electric shutter control circuit including a storing circuit is actuated before and after the operation of a switch for making or breaking a connection between a light measuring circuit and the storing circuit, so as to eliminate the introduction of errors in the time of exposure to be controlled.

SUMMARY OF THE INVENTION

The present invention, in order to achieve the above described objects and features, relates to a switch device in an electric shutter control circuit having a storing circuit, which is used in a single lens reflex camera, and comprises the following components. A switch actuating member includes electric contacts for a storage switch and at least one contact for the electromagnet switch and a discharge switch. A storage switch making or breaking a connection between the light measuring circuit and the storing circuit. An electromagnet switch making or breaking a connection between an electromagnet governing the termination of the exposure and a potential source in the electric shutter control circuit. A discharge switch allowing discharge of an electric charge from a time constant capacitor in the timing circuit. A switch actuating member being adapted to shift from a cocked position to a rest position by the release operation. An insulating plate having electrodes for the plurality of switches printed thereon, with which electrodes the electric switch contacts are brought into contact. The actuation of the plurality of switches is governed by the shifting of the switch actuating member from the cocked position to the rest position in association with the release operation.

The switch is equipped with a member shiftable from the cocked position to the rest position in association with the release operation and means for moving the same from the rest position to the cocked position in association with the termination of the exposure by means of the shutter.

The switch actuating member, when in the cocked position, closes the storage switch, as well as causes at least either the electromagnet switch or the discharge switch to open or close. The switch actuating member, when in the rest position, opens the storage switch as well as causes at least either the electromagnet switch or the discharge switch to close or open. When the switch actuating member is shifted from the cocked position to the rest position, through the shift of the aforedescribed driving means from the cocked position to the rest position in association with the release operation, it first opens the storage switch and then actuates other switches.

In association with the shifting of the actuating means from the cocked position to the rest position, a movable reflector is caused to shift from the viewing position to the picture taking position, and the shutter mechanism is released.

The operational sequence of these switches and members is such that the switch actuating member first opens the storage switch, then opens the discharge switch and the storage switch. Then the discharge switch is opened by the switch actuating member, followed by the closing of the electromagnet switch, and the driving of the movable reflector is carried out. Upon the completion of these movements, the shutter is released and, simultaneously with the commencement of the exposure, the trigger switch is closed.

In the drawings:

FIG. 4 *a* illustrates a front view of an essential component wherein the shutter exposure is completed, and FIG. 4 *b* shows a front view of the same essential component wherein the cocking of the shutter is completed;

FIGS. 5 through 7 are front views of another essential part of the same embodiment, in which

FIGS. 10 through 12 are front views of an essential part of the embodiment of FIG. 9, wherein

In the Figures the shutter mechanism is not illustrated.

DETAILED DESCRIPTION OF THE INVENTION

Figure 1:
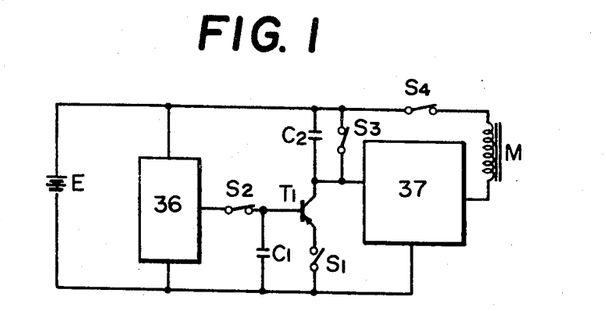
FIG. 1 is a circuit diagram showing a preferred embodiment of an electric shutter control circuit relating to the present invention.

FIG. 1 shows an electric control circuit relating to the present invention. Connected to a potential source E is a light measuring circuit 36 which receives light rays coming through an objective lens (not shown) from a photographic object. The light measuring circuit produces current commensurate with the brightness of the photographic object and produces an output voltage proportional to a logarithmic value of the brightness of the photographic object. The output of the light measuring circuit is connected through a storage switch S2 to a storage capacitor C1, and the voltage of capacitor C1 is fed as an input between the base and emitter of transistor T1 which effects an antilogarithmic conversion of the input voltage.

Connected to the collector of transistor T1 are a time constant capacitor C2 and a discharge switch S3, by which capacitor C2 is discharged. Trigger switch S1 is connected to the emitter of transistor T1.

The collector of transistor T1 is connected to switching circuit 37 which has an output terminal connected to electromagnet M. Switch S4 energizes the electromagnet. Both the output terminal and switch S4 are connected in series with potential source E.

When electromagnet switch S4 is closed and the switching circuit 37 is rendered conductive, a large amount of current flows to the electromagnet M, which causes a voltage drop in the potential source E. For this reason, it is imperative to maintain the switch for electromagnet S4 in the opened position during the time that storage switch S2 has been closed and the output of the light measuring circuit 36 is being fed to the storage capacitor C1, i.e. the switch for electromagnet S4 must be closed after the storage switch S2 has been opened, and said electromagnet switch S4 must be closed prior to the shutter release. Storage switch S2 must be opened immediately before a movable reflector starts to shift from the viewing position to the picture taking position.

Switch S3 for discharging the electric charge on capacitor C2 of the timing circuit is necessary to be closed before trigger switch S1 is closed, while trigger switch S1 must be closed simultaneously with the commencement of the exposure.

It is mandatory, as described, that the series of switches of various types are actuated in the proper sequence and that each switch is actuated in proper timing relative to the operation of the movable reflector or the operation for adjusting a diaphragm aperture and relative to a shutter release operation.

A first embodiment of a switch device for achieving the above described operations is shown in FIGS. 2 through 8. Shutter operating lever 1 is rotatably mounted on shaft 2 journaled in shutter base plate 4 of a photographic camera and has a tendency to be rotated in the clockwise direction by spring 3. Shutter operating lever 1 has three arms, in which first arm 1a has a concave-shaped side edge 1d, which is in engagement with actuating pin 20b provided on an actuating lever 20 (described below). First arm 1a has a tip formed with an engaging pawl. Second arm 1b has a tip connected with one end of spring 15, and third arm 1c has at its tip a face with which trigger lever 10 (described below) is urged into engagement.

Figure 2:
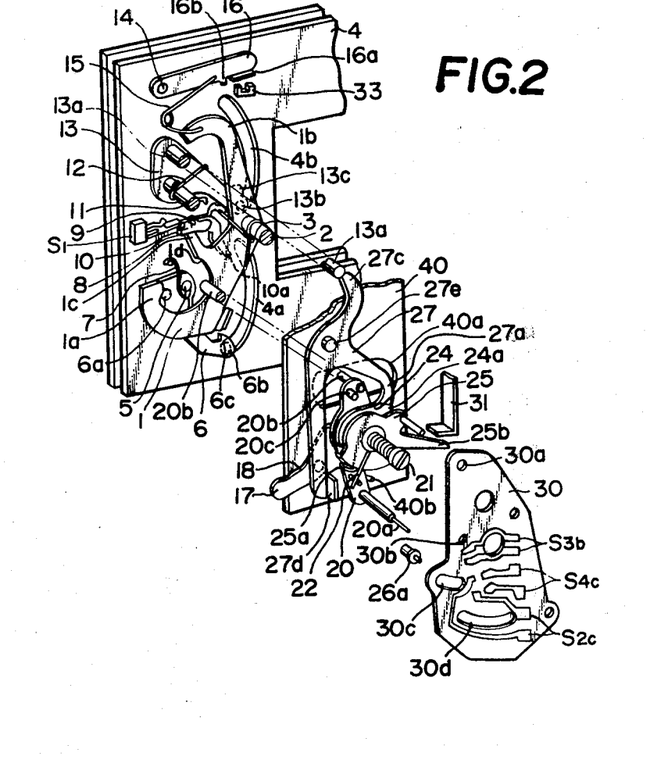
FIG. 2 is a perspective view of an essential part of a preferred embodiment of the present invention.

Shutter opening lever 6 is rotatably mounted on shaft 5 which is in turn journaled in shutter base plate 4 and has a tendency to be rotated in the clockwise direction by spring 7. Shutter opening lever 6 has 6a for engaging pawl 1a, guide pin 6b formed on one end thereof and slidable within arc-shaped slot 4a provided on shutter base plate 4, and hook portion 6c.

Trigger lever 10 is rotatably mounted on shaft 8 which is journaled in shutter base plate 4 so as to abut contacting face on arm 1c of shutter operating lever 1 and is given a tendency to rotate in the counterclockwise direction by spring 9. Trigger lever 10 has at its tip end engaging arm 10a, with which hook portion 6c of shutter release lever 6 is brought into engagement, when shutter opening lever 6 is urged in the counterclockwise direction into the cocked position by shutter operating lever 1 which is in turn rotated in the counterclockwise direction into the cocked position. Trigger lever 10 is equipped with trigger switch S1 having a tendency to be opened and adapted to be closed when trigger lever 10 is in the released position as shown in FIG. 2.

Rotatably mounted on shaft 11, which is journaled in shutter base plate 4, is shutter closing lever 13 which has a tendency to be rotated in the clockwise direction by spring 12. Shutter closing lever 13 has pin 13a engageable with second arm 1b, guide pin 13b provided on the end of the arm of lever 13 and loosely and slidably fitted within arc-shaped slot 4b formed on shutter base plate 4, and engaging projection 13c.

Second locking lever 16, which is rotatably mounted on shaft 14 journaled in shutter base plate 4 above shaft 11, is connected with the other end of spring 15 connected to second arm 1b. Second locking lever 16 has at its one end armature 16a, facing electrode 33 of electromagnet M which is attached on shutter base plate 4, and engaging pawl 16b adapted to engage projection 13c when shutter closing lever 13 is urged in the counterclockwise direction to locate guide pin 13b thereof at the upper extremity of arcuate slot 4b.

Figure 3:
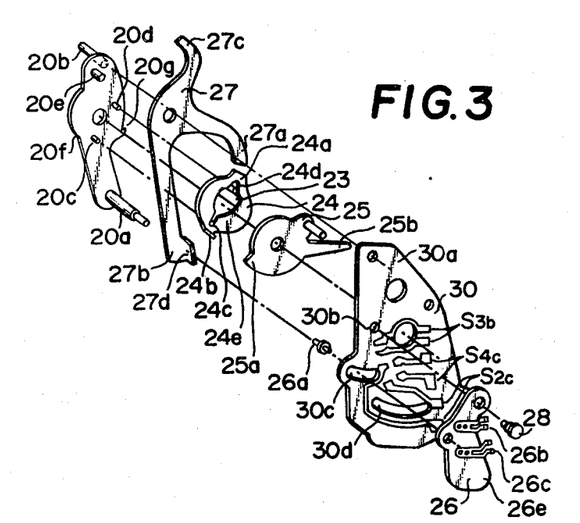
FIG. 3 is a perspective exploded view showing in more detail a portion of the structure in FIG. 2.
Figure 4A:
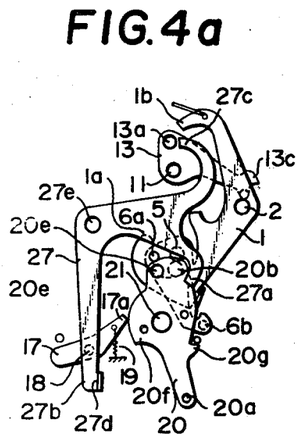
Figure 4B:
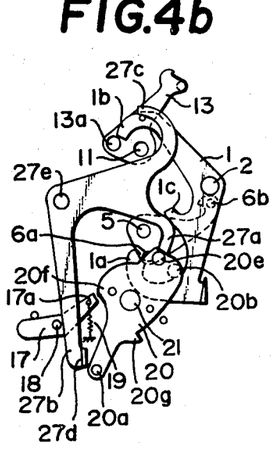

Actuating lever 20 is rotatably mounted on shaft 21, which is journaled on intermediate plate 40 attached to shutter base plate 4 in spaced relationship therefrom, and is given a tendency of being rotated in the counterclockwise direction by spring 22. Actuating lever 20, as best seen in FIG. 3, has actuating pin 20a engaging a cocking operating member (not shown), coupling pins 20c and 20d connecting with cam plate 24 (described below), and pin 20e adapted to engage antibouncing lever 27 (also described below). The aforedescribed actuating pin 20b is attached on a reverse face of intermediate plate 40, and extends through opening 40a formed in the intermediate plate to engage concave portion 1d of shutter operating lever 1. Actuating lever 20 has a circumference formed with cut-away portion 20f and a projection 20g. Cut-away portion 20f is adapted to engage first locking lever 17 (described below) when actuating lever 20 is rotated in the clockwise direction into the cocked position. Projection 20g is adapted to engage stop pin 40b of intermediate plate 40 which controls the rotation in the counterclockwise direction of the actuating lever, so as to define the rest position thereof.

Cam plate 24 is provided with holes 24c and 24d receiving respectively therein coupling pins 20c and 20d of actuating lever 20 so as to transmit thereto the rotation of actuating lever 20. Spring 23 is disposed within aperture 24e, through which shaft 21 extends, so as to eccentrically bias cam plate 24 relative to the axis of shaft 21. Cam plate 24 has a concentrically formed engaging face 24a and angled projection 24b formed on a side opposite engaging face 24a.

Mirror operating lever 25, which is rotatably mounted on shaft 21, is provided with projection 25a adapted to engage angled projection 24b in its cocked position and mirror operating arm 25b engageable with mirror actuating lever 31.

Antibouncing lever 27 is rotatably mounted on shaft 27e, which is in turn journaled in intermediate plate 40 and located on a common plane with cam plate 24. Antibouncing lever 27 has three arms, first arm 27a being engageable with engaging face 24a of cam plate 24, third arm 27c being engageable with the pin 13a of the aforedescribed shutter closing lever 13, and second arm 27b having angled projection 27d engageable with pin 26a attached on switch actuating layer lever 26 (described below).

First locking lever 17 is rotatably mounted on shaft 18, which is journaled in intermediate plate 40, and is given a tendency to be rotated in the clockwise direction by spring 19. Locking pawl 17a of first locking lever 17 slidingly contacts the circumference of actuating lever 20, such that when actuating lever 20 is urged into the cocked position, locking pawl 17a is brought into engagement with cut-away portion 20f, thereby locking actuating lever 20 in the cocked position.

Figure 5:
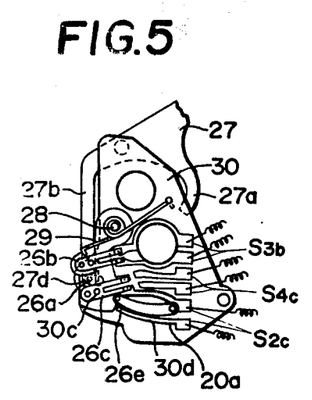
FIG. 5 shows the condition when the exposure terminates.
Figure 6:
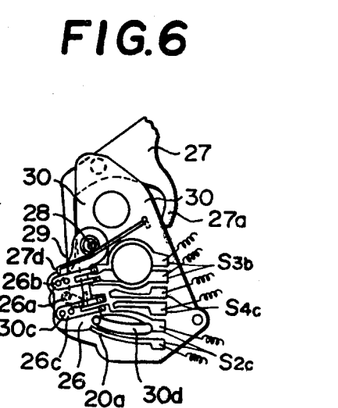
FIG. 6 illustrates the condition after the completion of the cocking of the shutter and FIG. 7 shows the condition where the release operation is carried out.

Insulating plate 30 is attached to intermediate plate 40 by shaft 27e which extends through hole 30a thereof and by shaft 28 fitted in another hole 30b of insulating plate 30. Insulating plate 30 has on its surface electrodes S2c of switch S2, electrodes S3b of switch S3 and electrodes S4c of switch S4, all of which are printed thereon with an electrically conductive material. Switch actuating lever 26 is rotatably journaled on shaft pin 28 fitted in hole 30b and is urged in the counterclockwise direction by spring 29 as shown in FIGS. 5 and 6. Switch actuating lever 26 has electric contacts 26b and 26c attached on its surface for slidingly contacting electrodes S2c, S3b and S4c of the series of switches. Pin 26a attached on switch actuating lever 26 is loosely fitted in and extends through arcuate slot 30c formed in insulating plate 30 into engagement with projection 27d of antibouncing lever 27. Side edge 26e of switch actuating lever 26 is adapted to engage actuating pin 20a, which extends through arcuate slot 30d formed in insulating plate 30, when actuating lever 20 is in the cocked position.

With the construction as described above, when the cocking member (not shown) is operated, actuating lever 20 is caused to rotate by means of actuating pin 20a in the clockwise direction against the force of spring 22, with actuating pin 20b engaging concave portion 1d of shutter operating lever 1 as shown in FIG. 2. Thereby, shutter operating lever 1 is caused to rotate in the counterclockwise direction against the force of spring 3. By means of the rotation of shutter operating lever 1, engaging pawl 1a thereof is brought into engagement with pin 6a to thereby rotate shutter releasing lever 6 in the counterclockwise direction against the force of spring 7, while the end of second arm 1b thereof urges pin 13a of shutter closing lever 13 to thereby rotate lever 13 in the counterclockwise direction against the force of spring 12, whereupon shutter opening lever 6 is brought into engagement with trigger lever 10, while shutter closing lever 13 is brought into engagement with second locking lever 16. Thus, both levers 13, 16 are locked in the cocked position. In the meantime, by the rotation of actuating lever 20 cam plate 24 is caused to rotate in the clockwise direction, while being biased by spring 23 relative to coupling pins 20c and 20d as shown in FIG. 3. When actuating lever 20 comes to the cocked position, projection 24b of cam plate 24 becomes engaged with engaging projection 25a of mirror operating lever 25, and upon the termination of the cocking of actuating lever 20, cutaway portion 20f is brought into engagement with first locking lever 17, thereby locking actuating lever 20 in the cocked position.

During the cocking operation of actuating lever 20, first arm 27a of antibouncing lever 27 becomes engaged with pin 20e of actuating lever 20 to be thereby rotated in the counterclockwise direction. Simultaneously, projection 27d of second arm 27b disengages from pin 26a projecting on switch actuating lever 26 to thereby release pin 26a which has been pressed in the clockwise direction. Simultaneously therewith, actuating pin 20a becomes engaged with side edge 26e of switch actuating lever 26 to rotate it in the clockwise direction (as shown in FIG. 6) against the force of spring 29, thereby locking switch actuating lever 26 in the cocked position. With the position of switch actuating lever 26 as described, electric contact 26b of switch actuating lever 26 is brought into contact with contact S3b of discharge switch S3 for time constant capacitor C2 as shown in FIG. 1, to thereby the discharge switch, and electric contact 26c is brought into contact with contact S2c of storage switch S2 to thereby close the storage switch, while electromagnet switch S4 still remains open.

Figure 7:
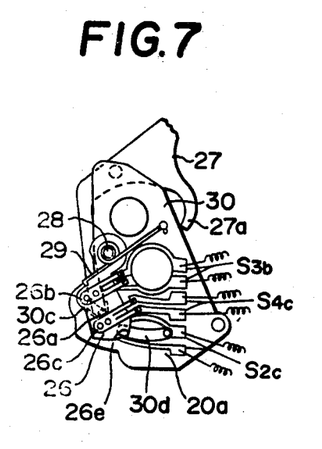
Figure 8:
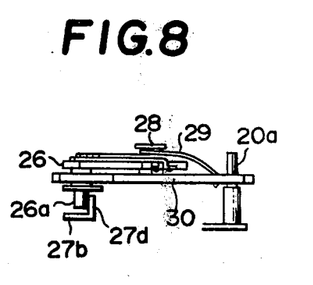
FIG. 8 is a side view of a switch device in the same embodiment.
Figure 9:
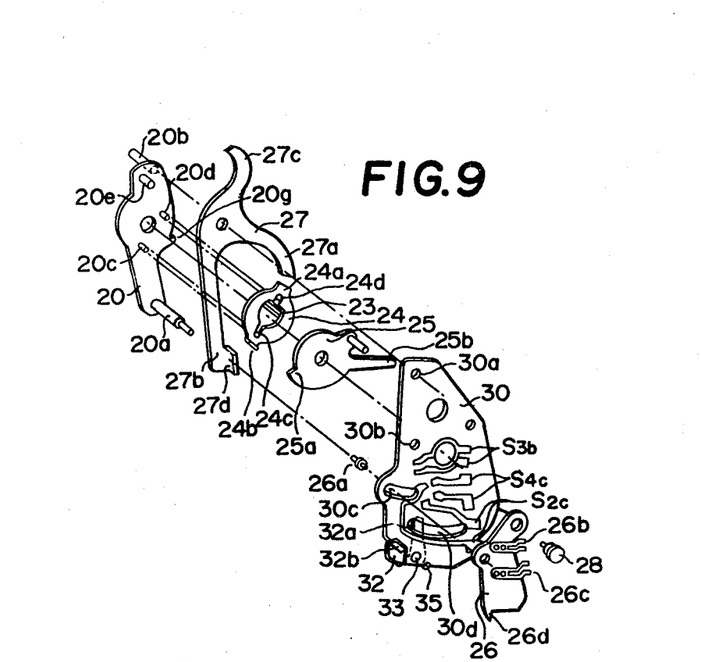
FIG. 9 is a perspective view showing a construction of an essential part of a second embodiment of the present invention.

When first locking lever 17 is caused to rotate in the counterclockwise direction for releasing the shutter, actuating lever 20 is first unlocked, then rotates in the counterclockwise direction by the action of spring 22, to thereby shift actuating pin 20a rightwards within slot 30d as shown in FIG. 7, such that switch actuating lever 26 is unlocked to rotate in the counterclockwise direction under the action of spring 29 into a rest position where it abuts against projection 27d which has been rotated in the counterclockwise direction as described. Whereupon, contact 26b detaches from contact S3b of discharge switch S3, thereby allowing the charging of capacitor C2, while contact 26c detaches from contact S2c of storage switch S2, to thereby open that switch. Then, contact S4c of electromagnet switch S4 is closed. Further, the rotation of actuating lever 20 causes cam plate 24 to rotate in the counterclockwise direction through the engagement of coupling pins 20c and 20d therewith, whereby projection 24b of cam plate 24 is brought into engagement with projection 25a of mirror operating lever 25, thereby rotating lever 25 in the counterclockwise direction. Consequently, mirror operating arm 25b becomes engaged with mirror actuating lever 31 to thereby lift the same (see FIG. 2), whereby the movable mirror (not shown) is sprung upwardly from the viewing position to the picture taking position.

In addition, through the counterclockwise directional rotation of actuating lever 20, shutter operating lever 1, following the rotation of the actuating pin 20b thereof is urged in the clockwise direction. Whereupon, the contacting face formed on third arm 1c of shutter operating lever 1 is brought into abutment with trigger lever 10 to thereby rotate trigger lever 10 in the clockwise direction so as to close switch S1, as well as to release shutter opening lever 6 from the cocked position where it has been locked through the counterclockwise rotation thereof. Consequently, shutter opening lever 6 is urged in the clockwise direction under the action of spring 7, thereby moving the front curtain of the shutter (not shown) to the opened position.

As the result of trigger switch S1 being closed, timing circuit 37 is actuated, and after a proper interval of time, electromagnet M becomes demagnetized (See FIG. 1) to release the armature of second locking lever 16 which has been attracted by magnetic pole 33. Consequently, second locking lever 16 is caused to rotate in the counterclockwise direction by the action of spring 15, thereby releasing shutter closing lever 13 from the cocked position where it has been locked by pawl 16b. Thus, shutter closing lever 13 is urged in the clockwise direction by the action of spring 12, so as to actuate the rear curtain of the shutter (not shown), thereby completing the exposure (see FIG. 2).

At the termination of the clockwise directional rotation of shutter closing lever 13, pin 13a thereof is urged into engagement with third arm 27c of antibouncing lever 27 serving to control the bounce of lever 13 by means of its friction spring (not shown), thereby rotating the same in the clockwise direction. Consequently, cam plate 24 is caused to be biased, against the force of spring 23, through the guidance of coupling pins 20c and 20d fitted in holes 24c and 24d, thereby disengaging projection 24b thereof from engaging projection 25a of mirror operating lever 25 (FIG 3). Thus, mirror operating lever 25 is rotatingly urged from the picture taking position to the viewing position by the action of the return spring which is disposed on the movable mirror (not shown), and then rotated for returning in the clockwise direction by means of mirror actuating lever 31.

In the meantime, antibouncing lever 27 is urged by pin 13a to rotate in the clockwise direction, such that angled projection 27d of lever 27 rotates, by means of pin 26a, switch actuating lever 26 in the clockwise direction against the force of spring 29 so as to lock the same in the cocked position as shown in FIG. 5. Thus, contact 26b closes contact S3b of discharge switch S3 to thereby short-circuit time constant capacitor C2, while contact 26c opens contact S4c of electromagnet switch S4 as well as closes contact S2c of storage switch S2, so as to prepare the device for the succeeding exposure. When actuating lever 20 is rotated in the clockwise direction to complete the cocking operation, actuating pin 20a thereof again arrests switch actuating lever 26 in the cocked position as described.

Figure 10:
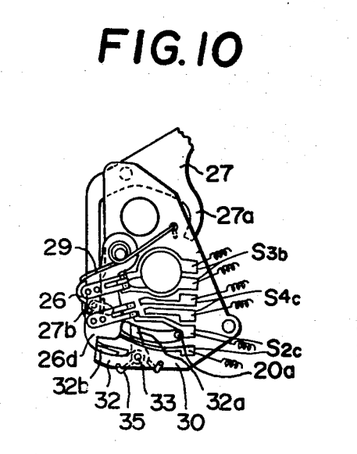
FIG. 10 shows the position of the components for termination of the exposure.
Figure 11:
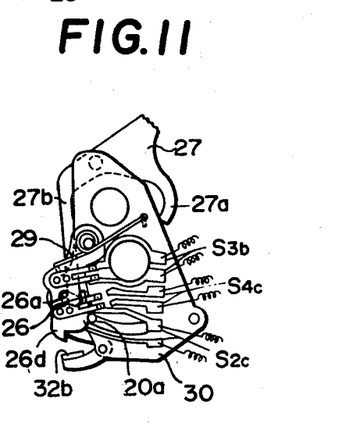
FIG. 11 shows the status of the same after the shutter has been cocked, the FIG. 12 shows the component positions with the shutter being released.
Figure 12:
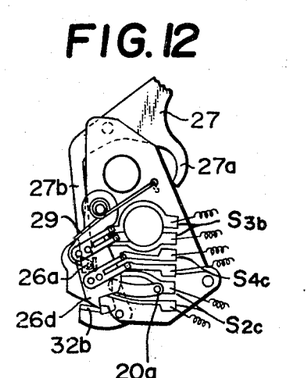
Figure 13:
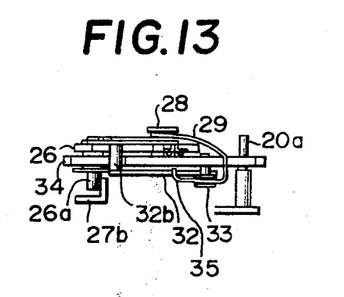
FIG. 13 is a side view of a switch device in the same embodiment.

FIGS. 9 through 13 show a second embodiment of the present invention, wherein the shutter mechanism is of the same construction as in the first embodiment, and hence no illustration or description thereof is given. Throughout FIGS. 9 to 13, members having the same function as those of the first embodiment are designated by the identical reference numerals. The second embodiment is different than the first embodiment in the following respects. In order to improve the accuracy in the operational switching sequence by switch actuating lever 26, stop member 32 is mounted on shaft 33 journaled in print base plate 34 and is urged in the clockwise direction by spring 35. Tail portion 32a of stop member 32 is in the rotational path of operating pin 20a which is moved through the shifting of the actuating lever 20 from the cocked position to the rest position. Head portion 32b of stop member 32 is engageable with pawl portion 26d formed on switch actuating lever 26 when that lever is at the position after rotating in the clockwise direction as shown in FIG. 10. When actuating pin 20a is urged in the clockwise direction by the cocking of the actuating lever and the cocking is completed, actuating pin 20a is brought into engagement with tail portion 32a to thereby urge it in the counterclockwise direction against the force of spring 35, with head portion 32b being disengaged from pawl 26d. Through the cocking of actuating lever 20, first arm 27a of antibouncing lever 27 is caused to rotate in the counterclockwise direction by actuating pin 20e against the force of the friction spring of lever 27. Consequently, angled projection 27d is disengaged from pin 26a of switch actuating lever 26, and therefore that lever tends to rotate in the counterclockwise direction. However, the rotation of switch actuating lever is controlled, since pawl 26d, at this stage, still remains in engagement with head portion 32b of stop member 32. When the engagement of head portion 32b with pawl 26d is released due to the termination of the cocking of actuating lever 20, actuating pin 20a in turn arrests switch actuating lever 26, such that an unwanted movement thereof from the cocked position to the rest position is fully impeded. Thus, by virtue of the stop member, the switches are prevented from accidental contact due to an unwanted movement of the switch actuating lever.

Figure 14:
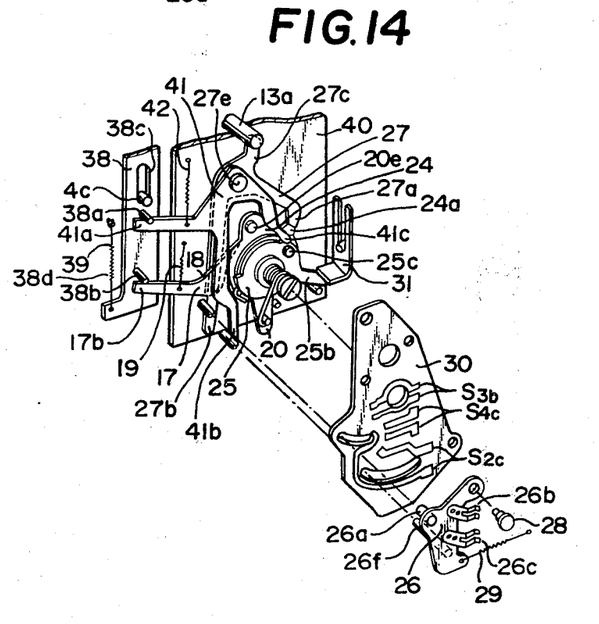
FIG. 14 is a perspective view according to a third embodiment of the present invention.

FIG. 14 shows a third embodiment of the present invention, in which the shutter mechanism is not shown because it is the same construction as that of the first embodiment, and members or portions thereof which are the same as, or equivalent to, those of the first embodiment are designated by identical reference numerals. The switch device of the third embodiment is so arranged that even if the shutter release operation is interrupted after that operation has been started and prior to the termination of the exposure, the shifting of the reflecting mirror by the actuating lever and the operation of the switch mechanism continue without interruption until the exposure terminates.

There is provided release lever 38 slidingly movable along guide slot 38c within which guide pin 4c is loosely fitted. Guide pin 4c is attached to shutter base plate 4 (shown in FIG. 2). Release lever 38 is biased by spring 38d and has two pins 38a and 38b projecting on the surface thereof. Pin 38b is adapted to engage, in its downward stroke, with first locking lever 17 which has engaging pawl 17a formed at one end and is rotatably mounted on shaft 18 journaled in intermediate plate 40. Release lever 38 has a tendency to rotate in the clockwise direction by spring 19. Pin 38a is in engaging relation with first arm 41a of switch operating lever 41 rotatably mounted on shaft 27e, which is journaled in intermediate plate 40 and has a tendency to rotate in the clockwise direction by spring 42.

Switch operating lever 41 has second arm 41b and third arm 41c; and third arm 41c is adapted to engage pin 25c mounted to mirror operating lever 25 when that lever is rotated in the counterclockwise direction to shift the movable mirror from the viewing position to the picture taking position.

Two pins 26a and 26f mounted to switch actuating lever 26, which is given a tendency to be rotated in the counterclockwise direction by spring 29, protrude through holes 30c and 30d formed in insulating plate 30, with pin 26a engaging second arm 27b of antibouncing lever 27 and with pin 26f engaging second arm 41b of switch operating lever 41.

The switch mechanism according to the second embodiment is equipped with other means, in addition to the construction of the first embodiment, such that while actuating lever 20 is in the rest position after the termination of the exposure as shown in FIG. 14, switch operating lever 41, after having been rotated in the clockwise direction, is positively arrested in the cocked position by second arm 41b and second arm 27b.

When actuating lever 20 is rotated in the clockwise direction by the cocking operation, pin 20e theeof is brought into engagement with first arm 27a of antibouncing lever 27, whereby antibouncing lever 27 is urged in the counterclockwise direction, to thereby disengage second arm 27b from pin 26a. At this stage, pin 26f of switch actuating lever 26 becomes engaged with second arm 41b, such that switch actuating lever 26 still remains in the cocked position, despite the force of spring 29 urging the same in the counterclockwise direction.

Through the release operation which moves release lever 38 downward against the force of spring 38d, pin 38a of lever 38 causes switch operating lever 41 to rotate in the counterclockwise direction. As second arm 41b of switch operating lever 41 is being rotated in the counterclockwise direction, switch actuating lever 26 is urged in the counterclockwise direction into the rest position, whereupon electric contacts 26b and 26c open or close switches S2c, S3b and S4c in the proper sequence, similar to that described in the first embodiment.

With the movement described, first locking lever 17 is urged in the counterclockwise direction by pin 38b, thereby releasing actuating lever 20 from the cocked position. Cam plate 24 and mirror actuating lever 25 are allowed to rotate in the counterclockwise direction, thereby shifting the movable reflector from the viewing position to the picture taking position as well as achieving shutter release.

The rotation of mirror actuating lever 25 brings pin 25c thereof into engagement with first arm 41a such that if the release lever 38, which has been pressed downward is released, switch operating lever 41 is retained in the position to be rotated in the counterclockwise direction.

When shutter closing lever 13 is rotated to the released position, pin 13a thereof is urged into engagement with third arm 27c of antibouncing lever 27 to thereby rotate the same in the clockwise direction. Whereupon, second arm 27b causes switch actuating lever 26 to rotate in the clockwise direction by pin 26a into the cocked position. First arm 27a becomes engaged with the engaging face 24a of cam plate 24, thereby urging the same against the force of spring 23, similar to the operation in the first embodiment. Consequently, the engagement of angled projection 24b with engaging projection 25a of mirror actuating lever 25 is released and mirror actuating lever 31 allows mirror operating lever 25 to rotate in the clockwise direction for returning to its initial position, by the action of a return spring (not shown). Thus, switch operating lever 41, which has been rotated in the counterclockwise direction and locked in that rotated position by pin 25c, is unlocked to rotate in the clockwise direction, whereby the condition as shown in FIG. 14 is restored.

Throughout the respective embodiments described, antibouncing lever 27 is used for transmitting the termination of the exposure by means of the shutter to switch actuating lever 26. This serves to shift switch actuating lever 26 from the rest position to the cocked position upon the termination of the exposure. Such means is not limited to antibouncing lever 27 but may be any one other structure so long as it is operable in association with the shutter release operation, such as for example a member which can be actuated by the travel of the rear curtain of the screen shutter. Either shutter closing lever 13 in each embodiment or a member adapted to be operated in association with lever 13 may be used for the purpose described. As an example, it is possible to use a film winding and releasing lever of a known type which is actuated when the travel of the rear curtain terminates.

It is apparent that many changes and modifications may be made without departing from the spirit or the scope of the present invention, and the present invention is not intended to be limited to the specific embodiments disclosed, other than those defined in the appended claims.

What is claimed is:

1. In a camera, a switch device in an electric shutter control circuit for controlling an exposure in response to shutter release operation, the electric shutter control circuit having a light measuring circuit, a storing circuit for retaining the output of the light measuring circuit, a timing circuit with a timing capacitor responsive to the storing circuit, and a power source, a shutter mechanism having an electromagnetic control member, said switch device comprising:

a first member movable in response to shutter release operation;
a second member movable in response to the movement of said first member;
a switch actuating member movable between a cocked position and a rest position and driven from said cocked position to said rest position in response to the movement of said second member;
an insulating base plate mounted adjacent said switch actuating member;
a discharge switch enabling charging or discharging of said timing capacitor and including a first electrode formed on said insulating base plate and a first contact formed on said switch actuating member to be slidable on said first electrode;
a storage switch for connecting or disconnecting said light measuring circuit with said storing circuit and including a second electrode formed on said insulating base plate and a second contact formed on said switch actuating member to be slidable on said second electrode;
an electromagnet switch for connecting or disconnecting said electromagnetic control member with said power source and including a third electrode formed on said insulating base plate, said second contact being slidable on said third electrode;
whereby with said switch actuating member in said cocked position said first contact is in contact with said first electrode, said second contact is in contact with said second electrode thereby connecting said light measuring circuit with said storing circuit, and concurrently therewith said electromagnet switch disconnects said electromagnetic control member and said power source, and with said switch actuating member in said rest position said second contact is parted from said second electrode to disconnect said light measuring circuit with said storing circuit and concurrently therewith said second contact comes into contact with said third electrode to connect said electromagnetic control member with said power source.

2. A switch device as in claim 1, further comprising: means for shifting said switch actuating member from said rest position to said cocked position in association with the termination of the exposure by said shutter mechanism.

3. A switch device as in claim 2, further comprising: means for locking said switch actuating member at said cocked position until the shutter release operation is effected.

4. A switch device as in claim 1 wherein the camera further has a movable reflector movable from a viewing position to a picture taking position and said switch device further comprising:

a driving means movable from a cocked position to a rest position for releasing said switch actuating member from said cocked position thereof and biased in said rest position thereof, the shifting of said driving means from said rest position to said cocked position cocking said shutter mechanism;
means for locking said driving means in said cocked position thereof;
means for unlocking said driving member from said means for locking in association with the release operation;
means for shifting said movable reflector from said viewing position to said picture taking position in association with the shifting of said driving member from said cocked position to said rest position thereof; and means for releasing said cocked shutter mechanism in association with the shift of said driving member from said cocked position to said rest position thereof.

5. A switch device as in claim 4, further comprising:
a trigger switch for actuating said timing circuit; and
means for actuating said trigger switch in association with the operation of said means for releasing said cocked shutter mechanism.

6. A switch device as in claim 1, further comprising mirror actuating means including a third member engaged with said second member and a fourth member engageable with said third member for actuating said mirror actuating member.

7. In a camera, a switch device in an electric shutter control circuit for controlling an exposure in response to shutter release operation, the electric shutter control circuit having a light measuring circuit, a storing circuit for retaining the output of the light measuring circuit, a timing circuit with a timing capacitor responsive to the storing circuit, and a power source, a shutter mechanism having an electromagnetic control member, said switch device comprising:
a first member movable in response to shutter release operation;
a second member movable in response to shutter release operation;
a third member movable in response to movement of said first member;
a switch actuating member movable between a cocked position and a rest position and driven from said cocked position to said rest position in response to movement of said second member;
an insulating base plate mounted adjacent said switch actuating member;
a discharge switch enabling charging or discharging of said timing capacitor and including a first electrode formed on said insulating base plate and a first contact formed on said switch actuating member to be slidable on said first electrode;
a storage switch for connecting or disconnecting said light measuring circuit with said storing circuit and including a second electrode formed on said insulating base plate and a second contact formed on said switch actuating member to be slidable on said second electrode;
an electromagnetic switch for connecting or disconnecting said electromagnetic control member with said power source and including a third electrode formed on said insulating base plate, said second contact being slidable on said third electrode;
with said switch actuating member in said cocked position said first contact is in contact with said first electrode, said second contact is in contact with said second electrode and is parted from said third electrode, and with said switch actuating member in said rest position said first contact is parted from said first electrode, said second contact is parted from said second electrode to disconnect said light measuring circuit from said storing circuit and said second contact comes into contact with said third electrode to connect said electromagnetic control member with said power source; and
a mirror actuating means movable in response to movement of said third member for actuating a mirror actuating member.

8. A switch device as in claim 7, wherein said mirror actuating means comprises a fourth member engaged with said third member and a fifth member engageable with said fourth member for actuating said mirror actuating member.

9. A switch device as in claim 7, further comprising means for engaging said fifth member with said fifth member actuating said mirror actuating member.

* * * * *